Figure 1:
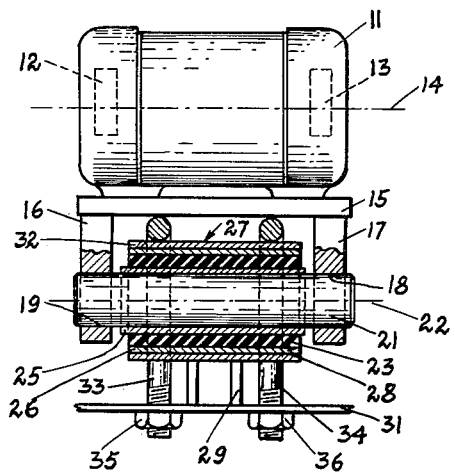

Oct. 19, 1965 G. RECHENBERG ETAL 3,212,345

OSCILLATOR FOR VIBRATING MACHINES

Filed Oct. 23, 1961

*INVENTOR.*
GERHARD RECHENBERG.
WERNER VOLK.
BY
ATTORNEYS.

United States Patent Office 3,212,345
Patented Oct. 19, 1965

3,212,345
OSCILLATOR FOR VIBRATING MACHINES
Gerhard Rechenberg, Darmstadt, and Werner Volk, Heubach, Germany, assignors to Dravo Corporation, Pittsburgh, Pa., a corporation of Pennsylvania
Filed Oct. 23, 1961, Ser. No. 146,982
Claims priority, application Germany, Oct. 29, 1960, Sch 28,688
6 Claims. (Cl. 74—87)

This invention relates to an oscillator or an exciter and, more particularly, to a mechanical oscillator for exciting forces which are transmitted to a vibrating machine such as a conveyor or shaker loader.

Unbalanced weight oscillators or vibrators of the general nature of the present invention have been employed as actuators for vibrator machines wherein the actuator or oscillator is mounted in an anti-friction bearing. The exciter forces of the oscillator are transmitted directly through the bearing to the vibratory machine, and resilient means are employed to hold the oscillator in a central position but do not transmit forces. In these known oscillators the bearings are not free from play, resulting in the forces of the oscillator to manifest themselves as shock forces which produce hard knocks on the attached vibratory machinery such as conveyors.

Heretofore, the undesired oscillator forces produced by unbalanced rotating weight segments, that is, those forces not in the direction of desired linear motion of the shaker machine, were nullified by the provision of more than one axis for rotation of unbalanced weights. The weights on one axis were rotated in a direction counter to those on another axis such that the force components were opposed along one line, and additive along another line. Accordingly, only that thrust line effective for imparting rectilinear motion to a conveyor, or the like, was transmitted to the conveyor.

By the provision in the instant invention of a novel mounting for an unbalanced weight unit of the oscillator, only desired forces, which are those in a plane of the center of gravity of the vibratory machine, are transmitted from the oscillator to the vibratory machine through resilient means thereby avoiding objectionable hard knocks or shock forces being produced. The latter exciter forces, which impart a pendulous motion to the oscillator rotating weight unit are absorbed by the resilient means.

Accordingly, it is a principal object of the invention to provide an oscillator for vibratory conveyors and the like which is effective to transmit certain of the exciter forces of the oscillator uniformly to the vibratory machine.

Another object of the invention is to provide a novel mounting for a vibratory machine oscillator or actuator which is free from torsional stresses due to the weight of an unbalanced segment unit which produces the vibratory forces.

A further object of the invention is the provision of an oscillator which is constructed of few elements and which is compact in design.

An oscillator illustrating certain features of the invention may include a housing positioned on a rocker with rotatable weights eccentrically mounted within the housing for producing the vibratory forces. A pendulum bolt or pin is attached to the rocker with its axis parallel to the axis of rotation of the revolving unbalanced weights, and a prestressed rubber member is mounted to surround the pin. Undesired components of the forces impart pendulous motion to the housing, rocker, and pin about the axis of the pin, and this motion is absorbed by the rubber member. Desired forces are those components in the plane which includes the pin axis and the axis of rotation of the weights, and these are transmitted directly through the rubber member to the vibratory machine.

Figure 2:
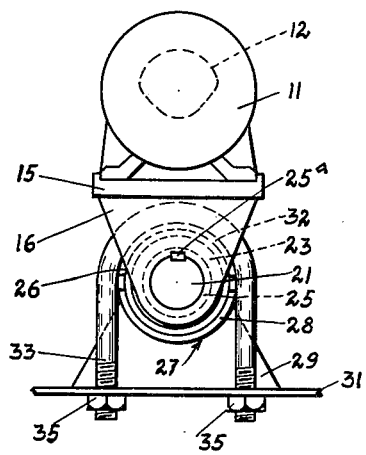
Figure 3:
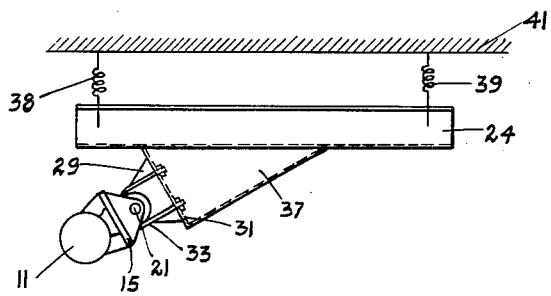
Figure 4:
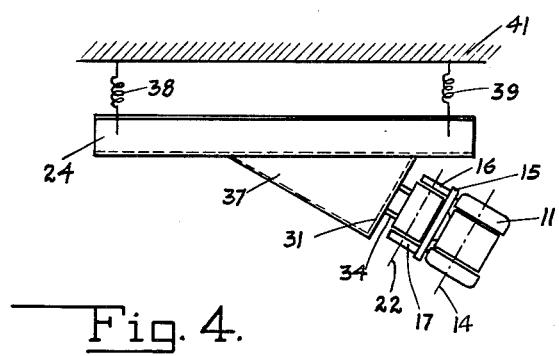

A complete understanding of the invention may be had from the following detailed description of a specific embodiment thereof when read in conjunction with the appended drawings, wherein:

FIG. 1 illustrates a side view of the oscillator, partly in section;
FIG. 2 is a front elevation of the oscillator;
FIG. 3 shows the attachment of the oscillator to a vibratory conveyor or the like; and
FIG. 4 represents another arrangement of the oscillator on a vibratory machine.

Referring now to the drawings wherein like reference characters designate like or corresponding parts throughout the several views, there is shown in FIGURE 1 a housing 11 within which are two eccentrically mounted weights 12 and 13 for rotation about an axis 14. The housing 11 is mounted fixedly on a rocker 15 having laterally spaced side plates 16 and 17, which are provided with apertures 18 and 19 and through which is received a pendulum pin or bolt 21. The pendulum pin is fixed by suitable means within the apertures 18 and 19 such that its axis 22 is parallel to the axis 14.

The exciter forces produced by the rotation of the weights 12 and 13 impart a pendulous motion to the housing 11, rocker 15, and pendulum pin 21 about the central axis 22 of the pin. The pendulous motion is absorbed by a prestressed torsion-elastic sleeve member 23; but the desired forces for actuating a vibratory conveyor or the like are transmitted directly through the member to the machine. The pendulum pin 21 is encompassed by the prestressed torsion-elastic sleeve member 23. Only those force components lying in the plane which includes the axes 22 and 14 are transmitted to a vibratory machine or conveyor 24, FIGS. 3 and 4. The generation of instantaneous shock forces or knocks by those force components which impart pendulous motion to the mentioned elements is avoided through the application of the prestressed sleeve-type rubber member 23 which absorbs the pendulous motion, but transmits the useful components of force. Preferably, the member 23 has an inner bushing 25 secured in location on the pin 21 by suitable means such as a key 25a. The inner bushing 25 may be designed as a pendulum pin, thereby obviating the need for the pendulum bolt 21. In this event, the inner bushing would be mounted within the apertures 18 and 19 in the same fashion as is the pendulum bolt 21 in the embodiment shown in FIG. 1.

As shown in FIGURES 1 and 2, an outer bushing 26 encompassing the sleeve 23 is clamped between two halves of a sleeve 27 with the lower half-sleeve 28 connected to a bracket 29 removably supported on a part 31 of the vibratory machine. The upper clamping half-sleeve 32 is urged into pressing engagement with the outer bushing 26 of the sleeve-type rubber member 23 by means of U-bolts 33 and 34 which are threadedly engaged to the part 31 of the vibratory machine with fasteners 35 and 36. It becomes readily appreciated that the pendulous motion hereinbefore mentioned is absorbed by the rubber member 23 so as not to be imparted to the vibratory machine part 31 to prevent shocks.

Referring now to FIGURE 3, there is shown the arrangement of the oscillator on a vibratory machine. The U-bolts 33 and 34 connect the mentioned structural elements of the vibrator or oscillator to a bracket 37 of a shaker 24, such as a vibratory conveyor or the like. To allow the conveyor 24 to vibrate freely it is fastened by means of springs 38 and 39 to a stationary beam 41. Since the axis 14 of the weights 12 and 13, and the axis 22 of the pendulum bolt 21 are illustrated in FIGURE 3 to lie in horizontal planes, the prestressed rubber member 23 is subjected to a torsional stress exerted by the weight of the oscillator. In the arrangement of the oscillator with the vibratory machine depicted in FIGURE 4, however, the mutually parallel axes 22 and 14 lie in a vertical plane such that the weight of the exciter or oscillator does not subject the rubber member 23 to torsional stresses. The center of gravity of the weights 12 and 13 within the housing 11, therefore, lies beneath the center of gravity of the sleeve-type rubber member 23 whereby torsional stresses due to the weight of the housing 11 and weights 12 and 13 are not imparted to the rubber member 23.

Having described the structural elements of the oscillator, its operation may now be briefly explained. Upon rotation of the eccentrically mounted weights 12 and 13 about the axis 14, the housing 11, the rocker 15 and the pendulous pin 21 execute pendulum motion about the central axis 22. The pendulum motion is absorbed by the prestressed rubber member but the forces in the plane of the parallel axes 22 and 14 are transmitted to a part 31 of a vibratory machine which is attached to the rubber member 23 by means of the U-bolts 33 and 34. Since the transmission of pendulous motion is lessened by the rubber member 23, substantially rectilinear exciter forces are transmitted to the vibrating machine.

It is manifest that the above-described embodiment of the invention is merely illustrative and that numerous modifications may be made within the spirit and scope of the invention.

We claim:

1. An oscillator for vibratory machines comprising a housing; a shaft supported within the housing; at least one weight eccentrically mounted on the shaft for producing exciter forces as the shaft rotates; a rocker member fixed to the housing and having parallel arms extending in a direction normal to the axis of the shaft; a pendulum pin bridging the arms and connected thereto in parallel relation to the axis of the shaft; a portion of exciter forces imparting pendulous motion to the housing, rocker, and pin about the central axis of the pin, a prestressed torsion-elastic sleeve coaxially mounted on the pin for absorbing the pendulous motion, and fastening means clamped around the sleeve and connected to the machine for transmitting exciter forces in the plane of the axes to the machine through the sleeve.

2. An oscillator for a vibratory machine comprising a housing, a shaft supported within the housing; at least one weight eccentrically mounted on the shaft for producing exciter forces as the shaft rotates; a rocker member fixed to the housing and having parallel arms extending in a direction normal to the axis of the shaft; a pendulum pin bridging the arms and connected thereto in parallel relation to the axis of the shaft; the exciter forces imparting pendulous motion to the housing, rocker, and pin about the central axis of the pin; a prestressed torsion-elastic sleeve coaxially mounted on the pin; a first half-sleeve in mating contact with the elastic sleeve; brackets fastened to the convex surface of the first half-sleeve for spacing the elastic sleeve on a vibratory machine; a second half-sleeve in mating contact with the elastic sleeve opposite the location of the first sleeve; yoke means in urging engagement with the second half-sleeve for clamping the elastic sleeve between the half sleeves; the yoke means including adjustable means for coupling the yoke means to a vibratory machine; the sleeve absorbing the pendulous motion and transmitting forces in the plane of the axes.

3. An oscillator for a vibratory machine comprising means including unbalanced weights rotatable about an axis for producing exciter forces; a rocker connected to the force producing means; a pendulum pin fixed to the rocker on an axis parallel to the axis of rotation of the rotatable weights; the force producing means, pin, and rocker having a pendulous motion about the pin axis imparted by the exciter forces; a prestressed torsion-elastic sleeve mounted coaxially on the pin; clamping means in embracing contact with the elastic sleeve; and means connecting the sleeve to the machine including yokes for transmitting forces in the plane of the axes to the vibratory machine through the sleeve, the sleeve absorbing the pendulous motion.

4. An oscillator as in claim 3 wherein an inner bushing is coaxially positioned in engagement with the inner wall of the elastic sleeve and is fixed to the pin for pendulous motion therewith.

5. An oscillator as in claim 4 wherein an outer bushing fixedly surrounds the elastic member.

6. An oscillator for a vibratory machine comprising unbalance means rotatable about an axis for producing exciter forces; a rocker connected to the unbalance means and having radial arms; a pin connected to the radial arms in parallel relation to the axis of rotation of the unbalance means; prestressed resilient means coaxially mounted on the pin between the arms; the exciter forces imparting pendulous motion to the unbalance means, rocker and pin about the axis of the pin; support means in contact with the resilient means diametrically opposite the unbalance means for positioning the unbalance means, rocker pin, and resilient means on a vibratory machine; and yoke means in pressing engagement with the resilient means urging the latter in the direction of the support means for clamping the resilient member in position and for transmitting the forces in the plane of the axes through the resilient means to the vibratory machine, the yoke means including fastener means for adjustably connecting the yoke means to the vibratory machine.

References Cited by the Examiner

UNITED STATES PATENTS

| 2,148,139 | 2/39 | Symons | 74—61 X |
| 2,894,397 | 7/59 | Brumagin | 74—61 |
| 2,899,044 | 8/59 | Allen et al. | 74—87 X |
| 2,939,720 | 6/60 | Wroby | 248—10 X |
| 3,061,079 | 10/62 | Morris. | |
| 3,089,582 | 5/63 | Musschoot et al. | 74—61 X |

FOREIGN PATENTS

| 1,092,307 | 4/55 | France. |
| 158,546 | 4/57 | Sweden. |

German printed application, Klattenhoff, 1,111,435, July 20, 1961.

BROUGHTON G. DURHAM, *Primary Examiner.*

MILTON KAUFMAN, *Examiner.*